US011782267B2

United States Patent
Suzuki et al.

(10) Patent No.: US 11,782,267 B2
(45) Date of Patent: Oct. 10, 2023

(54) MIRROR UNIT

(71) Applicant: HAMAMATSU PHOTONICS K.K., Hamamatsu (JP)

(72) Inventors: Daiki Suzuki, Hamamatsu (JP); Tomoyuki Ide, Hamamatsu (JP); Yuki Morinaga, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/749,697

(22) Filed: May 20, 2022

(65) Prior Publication Data
US 2022/0276487 A1 Sep. 1, 2022

Related U.S. Application Data

(63) Continuation of application No. 16/775,456, filed on Jan. 29, 2020, now Pat. No. 11,372,240.

(30) Foreign Application Priority Data

Jan. 30, 2019 (JP) .................................. 2019-014610
Jan. 28, 2020 (JP) .................................. 2020-011753

(51) Int. Cl.
*G02B 26/08* (2006.01)
*G02B 27/00* (2006.01)
*G02B 26/10* (2006.01)

(52) U.S. Cl.
CPC ....... *G02B 27/0031* (2013.01); *G02B 26/085* (2013.01); *G02B 26/0833* (2013.01);
(Continued)

(58) Field of Classification Search
CPC ...... G02B 26/105; G02B 5/08; G02B 26/101; G02B 27/0031; G02B 26/0833; G02B 26/085; G02B 26/10; G02B 27/0006
(Continued)

(56) References Cited

U.S. PATENT DOCUMENTS 6,295,154 B1 9/2001 Laor et al.
10,459,218 B2 10/2019 Suzuki et al.
(Continued)

FOREIGN PATENT DOCUMENTS

JP 2007-034309 A 2/2007
JP 2007-524112 A 8/2007
(Continued)

OTHER PUBLICATIONS

Ushiro, Kousuke et al., "Development and Verification for Next Generation System of Surrounding Environment Recogntion Technology—Third Report: System Architecture of MEMS Scanning 3D Range Sensor–", JARI Research Journal Nov. 3, 2017, Jan. 9, 2019 search, pp. 1-6, including partial English translation.
(Continued)

*Primary Examiner* — Euncha P Cherry
(74) *Attorney, Agent, or Firm* — Faegre Drinker Biddle & Reath LLP

(57) ABSTRACT

A mirror unit includes an optical scanning device, a frame member, and a window member. The frame member includes first and second wall portions facing each other in an X-axis direction. The first wall portion is higher than the second wall portion. The window member is disposed on a top surface of the first wall portion and a top surface of the second wall portion and is inclined with respect to a mirror surface of the optical scanning device. In a cross-section parallel to the X-axis direction, the first wall portion is separated from a first line passing through a first end at a side of the first wall portion in the mirror surface and a first corner portion formed at the side of the first wall portion by an outer surface opposite to the frame member and a first side surface in the window member.

14 Claims, 3 Drawing Sheets

(52) U.S. Cl.
CPC ........... *G02B 26/10* (2013.01); *G02B 26/101* (2013.01); *G02B 27/0006* (2013.01)

(58) Field of Classification Search
USPC ...................................................... 359/224.1
See application file for complete search history.

(56) References Cited

U.S. PATENT DOCUMENTS

| | | | |
|---|---|---|---|
| 11,372,238 | B2 | 6/2022 | Suzuki et al. |
| 11,592,662 | B2 | 2/2023 | Suzuki et al. |
| 2007/0024549 | A1 | 2/2007 | Choi et al. |
| 2009/0097087 | A1* | 4/2009 | Wolter .................. B81B 7/0067 |
| | | | 29/592 |
| 2010/0014147 | A1 | 1/2010 | Pinter et al. |
| 2015/0200105 | A1 | 7/2015 | Langa et al. |
| 2016/0356984 | A1 | 12/2016 | Horie et al. |

FOREIGN PATENT DOCUMENTS

| | | |
|---|---|---|
| JP | 2008-183636 A | 8/2008 |
| JP | 2013-246361 A | 12/2013 |
| JP | 2017-215352 A | 12/2017 |
| JP | 2018-017859 A | 2/2018 |
| JP | 2018-037582 A | 3/2018 |
| JP | 2018-132741 A | 8/2018 |
| WO | WO 2004/106221 A2 | 12/2004 |
| WO | WO 2019/012787 A1 | 1/2019 |

OTHER PUBLICATIONS

Hamamatsu Photonics K.K, "Product Flyer KSX-I50123G-E".

\* cited by examiner

// MIRROR UNIT

TECHNICAL FIELD

An aspect of the present disclosure relates to a mirror unit.

BACKGROUND

Japanese Unexamined Patent Publication No. 2017-215352 discloses a mirror unit including an optical scanning device having a mirror surface provided on a movable portion, a frame member disposed so as to surround the optical scanning device, and a flat window member covering an opening of the frame member. Light is incident to the mirror surface through the window member from the outside, is reflected by the mirror surface, and is emitted to the outside through the window member.

SUMMARY

In the mirror unit described in Japanese Unexamined Patent Publication No. 2017-215352, a height of one of a pair of wall portions constituting the frame member and facing each other is formed to be higher than the other and the window member disposed on the frame member is inclined with respect to the mirror surface. When the window member is inclined with respect to the mirror surface, the traveling direction of the light reflected by the window member can be different from the traveling direction of the light reflected by the mirror surface and the light reflected by the window member can be prevented from to be noise light. However, since the light reflected from the mirror surface is interrupted by the higher portion in the wall portions constituting the frame member, there is concern that an optical scannable range by the optical scanning device may be limited.

An object of an aspect of the present disclosure is to provide a mirror unit capable of widening a scannable range by an optical scanning device while reducing noise light.

A mirror unit according to an aspect of the present disclosure includes: an optical scanning device including a movable portion swingable around a predetermined axis and a mirror surface provided on the movable portion; a frame member disposed so as to surround the mirror surface when viewed from a first direction; and a window member formed in a plate shape and disposed on the frame member so as to cover an opening of the frame member, in which the frame member includes a first wall portion and a second wall portion which face each other in a second direction perpendicular to the first direction, in which a height of the first wall portion is higher than a height of the second wall portion, in which the window member is disposed on a top surface of the first wall portion and a top surface of the second wall portion and is inclined with respect to the mirror surface, and in which in a cross-section passing through the mirror surface and parallel to both the first direction and the second direction, the first wall portion is separated from a first line passing through a first end at a side of the first wall portion in the mirror surface and a first corner portion formed at the side of the first wall portion by an outer surface opposite to the frame member and a first side surface in the window member.

In the mirror unit, the height of the first wall portion is higher than the height of the second wall portion and the window member is disposed on the top surface of the first wall portion and the top surface of the second wall portion and is inclined with respect to the mirror surface. Accordingly, the traveling direction of the light reflected by the window member can be different from the traveling direction of the light reflected by the mirror surface and the light reflected by the window member can be prevented from to be noise light. Further, in the cross-section passing through the mirror surface and parallel to both the first direction and the second direction, the first wall portion is separated from the first line passing through the first end at a side of the first wall portion in the mirror surface and the first corner portion formed at the side of the first wall portion by the outer surface opposite to the frame member and the first side surface in the window member. Accordingly, since it is possible to prevent the light reflected from the mirror surface from being interrupted by the first wall portion higher than the second wall portion, it is possible to use the entire outer surface of the window member for optical scanning Thus, according to the mirror unit, it is possible to widen the scannable range by the optical scanning device while reducing noise light.

The axis may be parallel to a third direction and the first wall portion may be separated from the first line in a state in which the movable portion rotates to a maximum deflection angle around the axis. In this case, it is possible to further widen the scannable range by the optical scanning device.

In the cross-section, the second wall portion may be separated from a second line passing through a second end at the side of the second wall portion in the mirror surface and a second corner portion formed at the side of the second wall portion by the outer surface and a second side surface in the window member. In this case, it is possible to further widen the scannable range by the optical scanning device.

A fillet may be formed at a boundary part between an inner side surface of the first wall portion and an inner surface at a side of the frame member in the window member by a bonding material between the first wall portion and the window member and in the cross-section, the fillet may be separated from the first line. In this case, it is possible to further widen the scannable range by the optical scanning device.

A thickness of the window member may be thinner than a thickness of the first wall portion. In this case, it is possible to reduce the influence of refraction on optical scanning in the window member.

According to an aspect of the present disclosure, it is possible to provide a mirror unit capable of widening a scannable range by an optical scanning device while reducing noise light.

DETAILED DESCRIPTION

Figure 1:
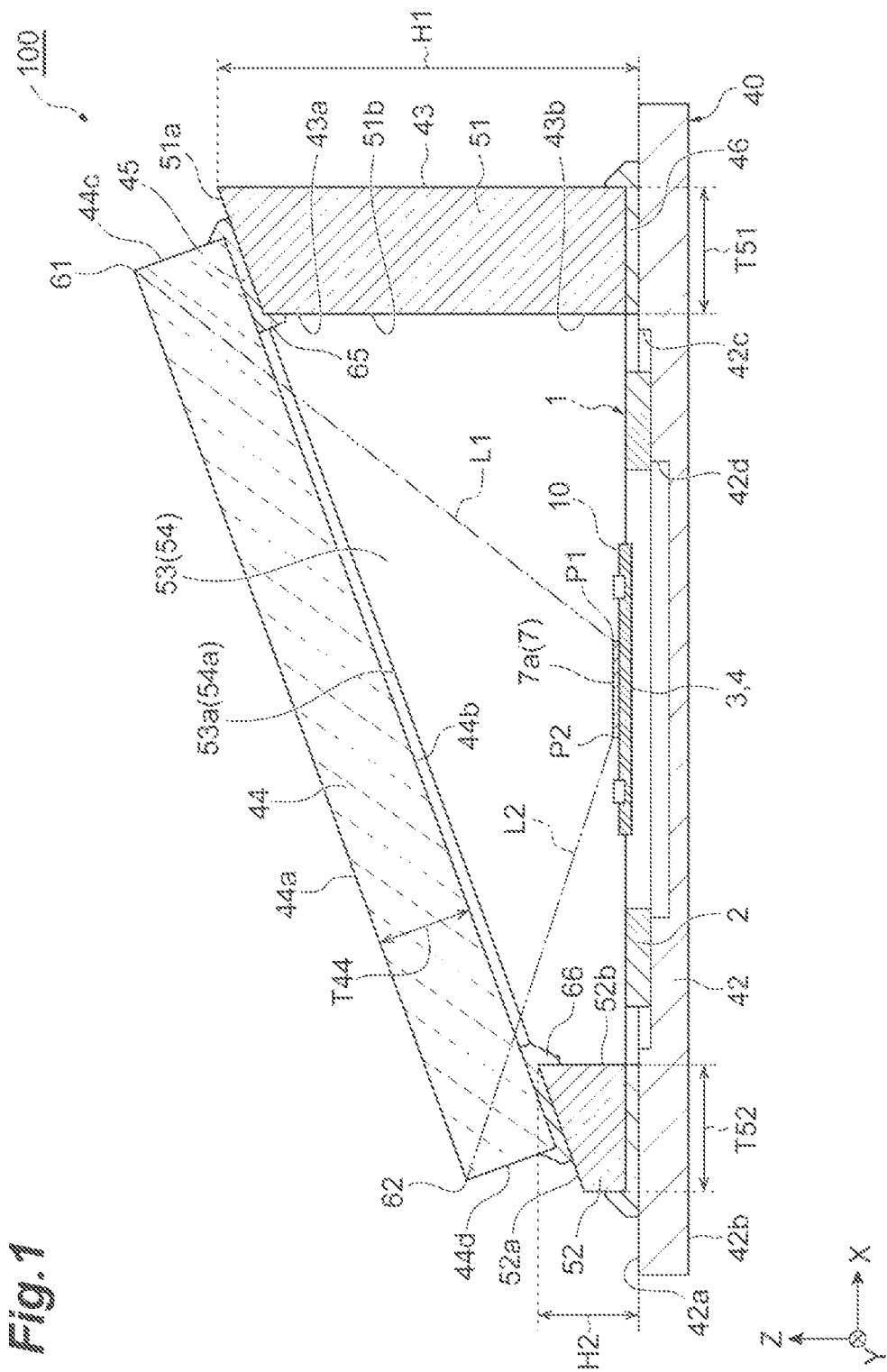
FIG. 1 is a cross-sectional view of a mirror unit according to an embodiment.

Hereinafter, an embodiment of the present disclosure will be described in detail with reference to the drawings. In the description below, the same or corresponding components will be denoted by the same reference numerals and redundant description will be omitted.

[Overall Configuration of Mirror Unit]

As illustrated in FIG. 1, a mirror unit 100 includes an optical scanning device 1 and a package 40 accommodating the optical scanning device 1. The package 40 includes a base 42, a frame member 43, and a window member 44.

The base 42 is formed in a rectangular plate shape from, for example, a non-magnetic material such as aluminum nitride or aluminum oxide. The base 42 includes a main surface 42a and a rear surface 42b on the side opposite to the main surface 42a. The main surface 42a is a surface constituting a part of the inner surface of the package 40. The main surface 42a is provided with a depression 42c. A bottom surface of the depression 42c is provided with a depression 42d. The optical scanning device 1 is disposed on the base 42, more specifically, a bottom surface of the depression 42c. A magnetic field generating unit (not illustrated) which generates a magnetic field acting on a first drive coil 11 and a second drive coil 12 of the optical scanning device 1 to be described later is disposed on the side of the rear surface 42b of the base 42. The magnetic field generating unit includes, for example, permanent magnets in a Halbach array.

The frame member 43 is disposed on the main surface 42a so as to surround the optical scanning device 1 (to surround a mirror surface 7a to be described later) when viewed from the Z-axis direction (the first direction) perpendicular to the main surface 42a of the base 42. The frame member 43 is formed in a rectangular frame shape from, for example, a non-magnetic material such as aluminum nitride or aluminum oxide.

The window member 44 is configured by, for example, forming an anti-reflection film on both surfaces of a rectangular plate base material formed of a light-transmitting material such as glass. The window member 44 is disposed on the frame member 43 so as to cover one opening 43a of the frame member 43 and faces the base 42 and the optical scanning device 1 in the Z-axis direction. The window member 44 is bonded to the frame member 43 by, for example, a bonding material 45 such as low-melting glass so as to hermetically seal the opening 43a.

The base 42 is bonded to the frame member 43 by, for example, a bonding material 46 such as low-melting glass so as to hermetically seal the other opening 43b of the frame member 43. Accordingly, the inside of the package 40 is hermetically sealed. The base 42 and the frame member 43 may be integrally formed so as to configure a single member.

The bonding with the bonding materials 45 and 46 is not limited to the bonding with the low-melting glass and may be, for example, bonding with resin adhesive, low-temperature solder (Sn/Pb or Sn/Cu-based), low-temperature brazing material (Au/Sn alloy, Au/Ge alloy, or the like), high-temperature brazing material (Ag-based or the like), projection welding, seam seal welding, laser welding, electron beam welding, or the like.

[Configuration of Optical Scanning Device]

Figure 2:
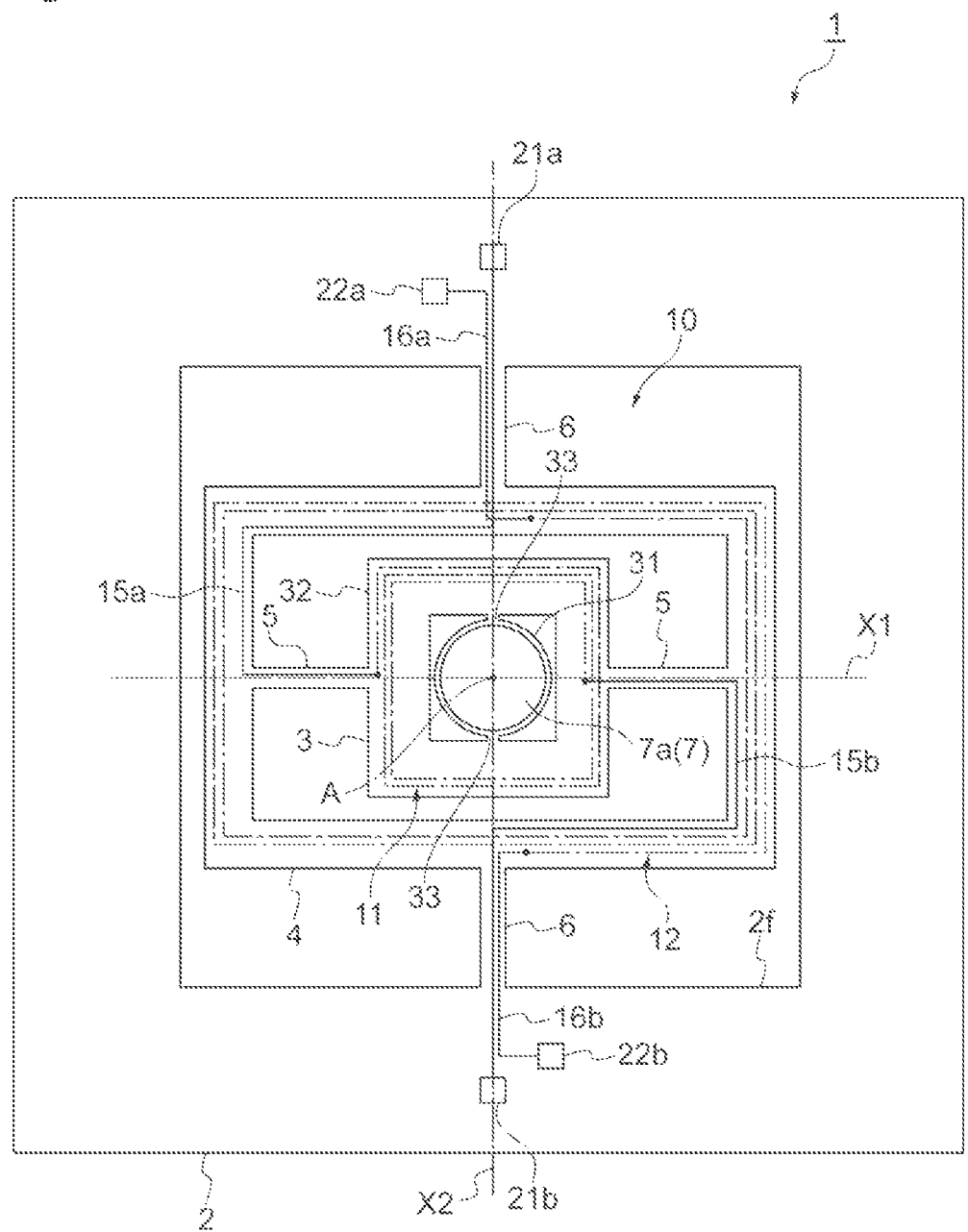
FIG. 2 is a plan view of an optical scanning device.

As illustrated in FIG. 2, the optical scanning device 1 includes a support portion 2 and a movable portion 10 which is swingable with respect to the support portion 2. The movable portion 10 includes a first movable portion 3, a second movable portion 4, a pair of first connection portions 5, a pair of second connection portions 6, and a mirror 7. The support portion 2, the first movable portion 3, the second movable portion 4, the pair of first connection portions 5, and the pair of second connection portions 6 are integrally formed by, for example, a Silicon on Insulator (SOI) substrate. That is, the optical scanning device 1 is configured as a Micro Electro Mechanical Systems (MEMS) device.

The first movable portion 3 is formed in, for example, a rectangular plate shape. The second movable portion 4 is formed in, for example, a rectangular ring shape so as to surround the first movable portion 3 with a gap when viewed from an optical axis direction A. The support portion 2 is formed in, for example, a rectangular ring shape so as to surround the second movable portion 4 with a gap when viewed from the optical axis direction A. That is, the support portion 2 is formed in a frame shape so as to surround the first movable portion 3 and the second movable portion 4 when viewed from the optical axis direction A.

The first movable portion 3 is connected to the second movable portion 4 via the pair of first connection portions 5 so as to be swingable around a first axis X1. That is, the first movable portion 3 is supported by the support portion 2 so as to be swingable around the first axis X1. The first movable portion 3 includes a first portion 31 and a second portion 32. The first portion 31 is formed in, for example, a circular shape when viewed from the optical axis direction A. The second portion 32 is formed in, for example, a rectangular ring shape when viewed from the optical axis direction A. The first portion 31 is surrounded by the second portion 32 when viewed from the optical axis direction A and is connected to the second portion 32 via a plurality of (in this example, two) connection portions 33. That is, gaps are formed between the first portion 31 and the second portion 32 except for the plurality of connection portions 33.

The connection portion 33 is located, for example, at the center of two sides of the rectangular inner edge of the second portion 32 intersecting a second axis X2. That is, in this example, the connection portion 33 is located on the second axis X2. The first portion 31 may be connected to the second portion 32 in a direction along at least the second axis X2.

The second movable portion 4 is connected to the support portion 2 via the pair of second connection portions 6 so as to be swingable around the second axis X2. That is, the second movable portion 4 is supported by the support portion 2 so as to be swingable around the second axis X2. The first axis X1 and the second axis X2 are perpendicular to the optical axis direction A and intersect each other (orthogonal to each other in this example). The first portion 31 may be formed in a rectangular shape or polygonal shape when viewed from the optical axis direction A. The first portion 31 may be formed in a circular shape (for example, an oval shape) when viewed from the optical axis direction A. The second portion 32 may be formed in a ring shape or a polygonal ring shape of a pentagon or more when viewed from the optical axis direction A.

The pair of first connection portions 5 are disposed on the first axis X1 so as to sandwich the first movable portion 3 in a gap between the second movable portion 4 and the second portion 32 of the first movable portion 3. Each first connection portion 5 functions as a torsion bar. The pair of second connection portions 6 is disposed on the second axis X2 so as to sandwich the second movable portion 4 in a gap between the second movable portion 4 and the support portion 2. Each second connection portion 6 functions as a torsion bar.

The mirror 7 is provided on the first portion 31 of the first movable portion 3. The mirror 7 is formed on the surface at the side opposite to the base 42 (at the side of the window member 44) in the first portion 31 so as to include an intersection point between the first axis X1 and the second axis X2. For example, the mirror 7 is formed in a circular, oval, or rectangular film shape from a metal material such as aluminum, an aluminum-based alloy, gold, or silver. A surface at the side opposite to the first movable portion 3 in the mirror 7 constitutes the mirror surface 7a extending in a direction perpendicular to the optical axis direction A. The center (geometric center, centroid) of the mirror surface 7*a* matches the intersection between the first axis X1 and the second axis X2 when viewed from the optical axis direction A. In this way, since the mirror 7 is provided on the first portion 31 connected to the second portion 32 through the plurality of connection portions 33, deformation such as bending of the mirror 7 can be prevented even when the first movable portion 3 swings around the first axis X1 at the resonant frequency level.

The distance from the outer edge of the mirror surface 7*a* to the outer edge of the first portion 31 is smaller than the width of the connection portion 33. The width of the connection portion 33 is the length in a direction (in this example, a direction along the first axis X1) perpendicular to the extension direction of the connection portion 33 (in this example, a direction along the second axis X2). The first movable portion 3 may not include the second portion 32 and the connection portion 33. The distance from the outer edge of the mirror surface 7*a* to the outer edge of the first portion 31 may be smaller than the width of the second connection portion 6. The width of the second connection portion 6 is the length in a direction (in this example, a direction along the first axis X1) perpendicular to the extension direction of the second connection portion 6 (in this example, a direction along the second axis X2).

Further, the optical scanning device 1 includes a first drive coil 11, a second drive coil 12, wirings 15*a* and 15*b*, wirings 16*a* and 16*b*, electrode pads 21*a* and 21*b*, and electrode pads 22*a* and 22*b*. In FIG. 2, for convenience of description, the first drive coil 11 and the second drive coil 12 are indicated by a one dotted chain line and the wirings 15*a* and 15*b* and the wirings 16*a* and 16*b* are indicated by a solid line.

The first drive coil 11 is provided in the second portion 32 of the first movable portion 3. The first drive coil 11 is wound a plurality of times in a spiral shape (a swirl shape) in a region outside the mirror 7 (that is, the second portion 32) when viewed from the optical axis direction A. A magnetic field generated by the magnetic field generating unit acts on the first drive coil 11.

The first drive coil 11 is disposed in a groove formed on the surface of the first movable portion 3. That is, the first drive coil 11 is buried in the first movable portion 3. One end of the first drive coil 11 is connected to the electrode pad 21*a* through the wiring 15*a*. The wiring 15*a* extends from the first movable portion 3 to the support portion 2 through one first connection portion 5, the second movable portion 4, and one second connection portion 6. For example, the wiring 15*a* and the electrode pad 21*a* are integrally formed of a metal material such as tungsten, aluminum, gold, silver, copper, or an aluminum-based alloy.

The other end of the first drive coil 11 is connected to the electrode pad 21*b* through the wiring 15*b*. The wiring 15*b* extends from the first movable portion 3 to the support portion 2 through the other first connection portion 5, the second movable portion 4, and the other second connection portion 6. For example, the wiring 15*b* and the electrode pad 21*b* are integrally formed of a metal material such as tungsten, aluminum, gold, silver, copper, or an aluminum-based alloy.

The second drive coil 12 is provided in the second movable portion 4. The second drive coil 12 is wound a plurality of times in a spiral shape (a swirl shape) in the second movable portion 4. A magnetic field generated by the magnetic field generating unit acts on the second drive coil 12. The second drive coil 12 is disposed in a groove formed on the surface of the second movable portion 4. That is, the second drive coil 12 is buried in the second movable portion 4.

One end of the second drive coil 12 is connected to the electrode pad 22*a* through the wiring 16*a*. The wiring 16*a* extends from the second movable portion 4 to the support portion 2 through one second connection portion 6. For example, the wiring 16*a* and the electrode pad 22*a* are integrally formed of a metal material such as tungsten, aluminum, gold, silver, copper, or an aluminum-based alloy.

The other end of the second drive coil 12 is connected to the electrode pad 22*b* through the wiring 16*b*. The wiring 16*b* extends from the second movable portion 4 to the support portion 2 through the other second connection portion 6. For example, the wiring 16*b* and the electrode pad 22*b* are integrally formed of a metal material such as tungsten, aluminum, gold, silver, copper, or an aluminum-based alloy.

Hereinafter, first to fifth examples will be described as an operation example of the movable portion 10 of the optical scanning device 1. In the first example, a high-frequency drive current is applied to the first drive coil 11. At this time, since a magnetic field generated by the magnetic field generating unit acts on the first drive coil 11, a Lorentz force is generated in the first drive coil 11. Accordingly, the first movable portion 3 is swung around the first axis X1, for example, at the resonant frequency level.

Further, a drive current of a certain magnitude is applied to the second drive coil 12. At this time, since a magnetic field generated by the magnetic field generating unit acts on the second drive coil 12, a Lorentz force is generated in the second drive coil 12. Accordingly, the second movable portion 4 is rotated around the second axis X2, for example, in response to the magnitude of the drive current and is stopped at that state. Accordingly, according to the optical scanning device 1, light emitted from a predetermined light source can be scanned while being reflected by the mirror surface 7*a*. Light is incident to the mirror surface 7*a* through the window member 44 from the outside, is reflected by the mirror surface 7*a*, and is emitted to the outside through the window member 44. In the first example, the first movable portion 3 is swung at the resonant frequency and the second movable portion 4 is used statically.

In the second example, similarly to the operation of the first movable portion 3 of the first example, the first movable portion 3 is swung in response to the resonant frequency when a high-frequency drive current is applied to the first drive coil 11 and the second movable portion 4 is swung in response to the resonant frequency when a high-frequency drive current is applied to the second drive coil 12. In this way, in the second example, both the first movable portion 3 and the second movable portion 4 are swung at the resonant frequency.

In the third example, similarly to the operation of the second movable portion 4 of the first example, the first movable portion 3 is rotated and stopped around the first axis X1 in response to the magnitude of the drive current when a drive current of a certain magnitude is applied to the first drive coil 11 and the second movable portion 4 is rotated and stopped around the second axis X2 in response to the magnitude of the drive current when a drive current of a certain magnitude is applied to the second drive coil 12. In this way, in the third example, both the first movable portion 3 and the second movable portion 4 are used statically.

In the fourth example and the fifth example, only the first movable portion 3 is driven. In the fourth example, since a high-frequency drive current is applied to the first drive coil 11, the first movable portion 3 is swung in response to the resonant frequency. In the fifth example, since a drive current of a certain magnitude is applied to the first drive coil 11, the first movable portion 3 is rotated and stopped around the first axis X1 in response to the magnitude of the drive current. The fourth example and the fifth example can be used, for example, in a case in which the second movable portion 4 is not provided or the like.

As described above, the optical scanning device 1 is disposed on the base 42. The support portion 2 is fixed to the bottom surface of the depression 42c and the first movable portion 3 and the second movable portion 4 face the bottom surface of the depression 42d. Since the depression 42d is provided, the first movable portion 3 and the second movable portion 4 can swing without interfering with the base 42.

[Configuration of Package]

Figure 3:
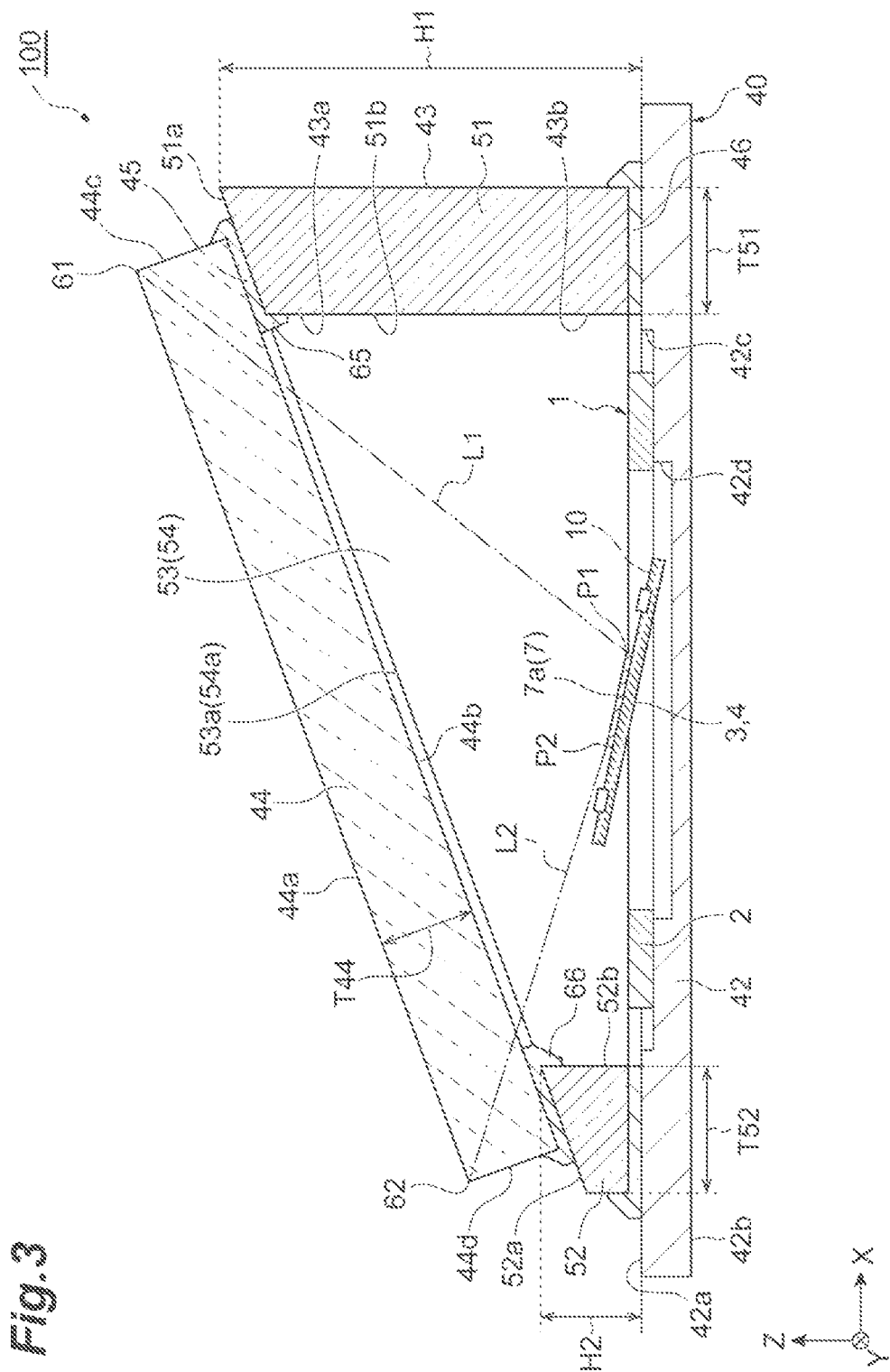
FIG. 3 is a cross-sectional view of the mirror unit while a movable portion rotates.

As illustrated in FIGS. 1 and 3, the frame member 43 includes a first wall portion 51, a second wall portion 52, a third wall portion 53, and a fourth wall portion 54. Each of the wall portions 51 to 54 is formed in a plate shape and has the same thickness. The first wall portion 51 and the second wall portion 52 extend in parallel to each other and face each other in the X-axis direction (the second direction) perpendicular to the Z-axis direction. The third wall portion 53 and the fourth wall portion 54 extend in parallel to each other and face each other in the Y-axis direction (the third direction) perpendicular to both the Z-axis direction and the X-axis direction. The third wall portion 53 is connected to one end of the first wall portion 51 and one end of the second wall portion 52 and the fourth wall portion 54 is connected to the other end of the first wall portion 51 and the other end of the second wall portion 52. The third wall portion 53 and the fourth wall portion 54 have, for example, the same shape.

A top surface 51a at the side opposite to the base 42 in the first wall portion 51 is inclined with respect to the main surface 42a so as to move away from the main surface 42a of the base 42 as it goes away from the second wall portion 52. A top surface 52a at the side opposite to the base 42 in the second wall portion 52 is inclined with respect to the main surface 42a so as to move away from the main surface 42a of the base 42 as it goes toward the first wall portion 51. A height H1 of the first wall portion 51 is higher than a height H2 of the second wall portion 52. The height H1 of the first wall portion 51 is a maximum value of the distance from the main surface 42a to the top surface 51a and the height H2 of the second wall portion 52 is a maximum value from the main surface 42a to the top surface 52a.

A top surface 53a at the side opposite to the base 42 in the third wall portion 53 is inclined with respect to the main surface 42a so as to move away from the main surface 42a of the base 42 as it goes toward the first wall portion 51 when viewed from the Y-axis direction. A top surface 54a at the side opposite to the base 42 in the fourth wall portion 54 is inclined with respect to the main surface 42a so as to move away from the main surface 42a of the base 42 as it goes toward the first wall portion 51 when viewed from the Y-axis direction.

The top surfaces 51a to 54a are flush with one other and located on the same plane. The window member 44 is disposed on the top surfaces 51a to 54a and is inclined with respect to the main surface 42a (the mirror surface 7a) so as to move away from the main surface 42a as it goes from the second wall portion 52 toward the first wall portion 51. In other words, each of the top surfaces 51a to 54a is inclined corresponding to an angle of the inclination of the window member 44.

The first wall portion 51 may be formed by a plurality of portions. These portions may be formed separately with a gap provided therebetween. In the embodiment, the entire top surface 51a is formed flat, but the top surface 51a may be divided into a plurality of regions by forming a notch, a depression, a convex portion, or the like on the top surface 51a. The entire top surface 51a does not need to be inclined at an angle corresponding to the inclination of the window member 44. For example, a line connecting two points in the top surface 51a may be inclined at an angle corresponding to the inclination of the window member 44. These matters are the same for the second wall portion 52 to the fourth wall portion 54. The window member 44 may not be bonded to the frame member 43 in the entire top surfaces 51a to 54a and may be boded to the frame member 43 in at least a part of the top surfaces 51a to 54a.

The window member 44 includes an outer surface 44a, an inner surface 44b, a first side surface 44c, a second side surface 44d, a third side surface, and a fourth side surface. The outer surface 44a is a surface at the side opposite to the frame member 43 and the inner surface 44b is a surface at the side of the frame member 43. The outer surface 44a and the inner surface 44b extend in parallel to each other. The first side surface 44c, the second side surface 44d, the third side surface, and the fourth side surface extend in a direction perpendicular to the outer surface 44a and the inner surface 44b and are continuous to the outer surface 44a and the inner surface 44b. The window member 44 is disposed on the frame member 43 so that the inner surface 44b faces the top surfaces 51a to 54a. The first side surface 44c, the second side surface 44d, the third side surface, and the fourth side surface are respectively located on the top surface 51a, the top surface 52a, the top surface 53a, and the top surface 54a.

The window member 44 includes a first corner portion 61 formed at the side of the first wall portion 51 by the outer surface 44a and the first side surface 44c and a second corner portion 62 formed at the side of the second wall portion 52 by the outer surface 44a and the second side surface 44d. When viewed from the Z-axis direction, the first corner portion 61 overlaps the top surface 51a and the second corner portion 62 overlaps the top surface 52a. A thickness T44 of the window member 44 is thinner than a thickness T51 of the first wall portion 51 and a thickness T52 of the second wall portion 52. In this example, the thickness T51 of the first wall portion 51 is the same as the thickness T52 of the second wall portion 52. In this example, the first side surface 44c is a flat surface, but the first side surface 44c may be a curved surface. In this case, the first corner portion 61 is formed at a boundary part between the flat outer surface 44a and the curved first side surface 44c. Similarly, the second side surface 44d may be a curved surface. In this case, the second corner portion 62 is formed at a boundary part between the flat outer surface 44a and the curved second side surface 44d.

A fillet 65 is formed at a boundary part between the inner side surface 51b of the first wall portion 51 and the inner surface 44b of the window member 44 by a bonding material 45 between the first wall portion 51 and the window member 44. A fillet 66 is formed in a boundary part between the inner side surface 52b of the second wall portion 52 and the inner surface 44b of the window member 44 by a bonding material 45 between the second wall portion 52 and the window member 44. The fillets 65 and 66 are formed such that the bonding material 45 protrudes from a gap between the frame member 43 and the window member 44 toward the inside of the package 40.

A positional relationship of the respective members will be described with reference to FIGS. 1 and 3. The optical scanning device 1 is disposed, for example, so that the first axis X1 is parallel to the X-axis direction and the second axis X2 is parallel to the Y-axis direction. FIGS. 1 and 3 illustrate a cross-section parallel to both the X-axis direction and the Z-axis direction (a cross-section perpendicular to the Y-axis direction) and passing through the center of the mirror surface 7a. Hereinafter, a positional relationship of respective members in the cross-section will be described.

FIG. 1 illustrates a non-rotation state (a non-drive state and an initial state) in which the movable portion 10 does not rotate around the first axis X1 and the second axis X2. In the non-rotation state, the first movable portion 3 does not rotate around the first axis X1 and the second movable portion 4 does not rotate around the second axis X2. In the non-rotation state, the mirror surface 7a is parallel to the main surface 42a of the base 42.

In the non-rotation state, the first wall portion 51 is separated from a first line L1 passing through a first end P1 corresponding to an end portion at the side of the first wall portion 51 in the mirror surface 7a and a vertex of the first corner portion 61. That is, the first line L1 does not intersect the first wall portion 51. Further, in the non-rotation state, the second wall portion 52 is separated from a second line L2 passing through a second end P2 corresponding to an end portion at the side of the second wall portion 52 in the mirror surface 7a and a vertex of the second corner portion 62. That is, the second line L2 does not intersect the second wall portion 52. Further, in the non-rotation state, the fillet 65 is separated from the first line L1 and the fillet 66 is separated from the second line L2. That is, the first line L1 does not intersect the fillet 65 and the second line L2 does not intersect the fillet 66.

FIG. 3 illustrates a state in which the second movable portion 4 rotates to the maximum deflection angle around the second axis X2. In this state, the first movable portion 3 does not rotate around the first axis X1. Also in the state illustrated in FIG. 3, the first wall portion 51 is separated from the first line L1 and the fillet 65 is separated from the first line L1. Further, the second wall portion 52 is separated from the second line L2 and the fillet 66 is separated from the second line L2.

When the mirror surface 7a is formed by mirror-finishing the surface of the first movable portion 3, the end portion of the mirror surface 7a is the end portion of the processed region. Alternatively, when a reflection film is not formed and the surface itself of the first movable portion 3 constitutes the mirror surface 7a, the end portion of the mirror surface 7a is the end portion of the first movable portion 3. In the above-described embodiment, the first movable portion 3 is connected to the first connection portion 5 in a cross-section perpendicular to the Y-axis direction and passing through the center of the mirror surface 7a. In this case, the end portion of the first movable portion 3 is located at a boundary part between the first movable portion 3 and the first connection portion 5. As in the embodiment, when the first movable portion 3 includes the first portion 31 and the second portion 32 surrounding the first portion 31 and the mirror surface 7a is provided on the first portion 31, the end portion of the mirror surface 7a is located in the vicinity of the end portion of the first portion 31.

[Function and Effect]

In the mirror unit 100, the height H1 of the first wall portion 51 is higher than the height H2 of the second wall portion 52 and the window member 44 is disposed on the top surface 51a of the first wall portion 51 and the top surface 52a of the second wall portion 52 and is inclined with respect to the mirror surface 7a. Accordingly, the traveling direction of the light reflected by the window member 44 can be different from the traveling direction of the light reflected by the mirror surface 7a and the light reflected by the window member 44 can be prevented from to be noise light. Further, in a cross-section parallel to both the X-axis direction and the Z-axis direction and passing through the mirror surface 7a, the first wall portion 51 is separated from the first line L1 passing through the first end P1 at the side of the first wall portion 51 in the mirror surface 7a and the first corner portion 61 formed at the side of the first wall portion 51 by the outer surface 44a and the first side surface 44c of the window member 44. Accordingly, since it is possible to prevent the light reflected from the mirror surface 7a from being interrupted by the first wall portion 51 higher than the second wall portion 52, it is possible to use the entire outer surface 44a of the window member 44 for optical scanning Thus, according to the mirror unit 100, it is possible to widen the scannable range by the optical scanning device 1 while reducing noise light.

In a state in which the movable portion 10 rotates to a maximum deflection angle around the second axis X2, the first wall portion 51 is separated from the first line L1. Accordingly, it is possible to further widen the scannable range by the optical scanning device 1.

In the cross-section illustrated in FIG. 1, the second wall portion 52 is separated from the second line L2 passing through the second end P2 at the side of the second wall portion 52 in the mirror surface 7a and the second corner portion 62 formed at the side of the second wall portion 52 by the outer surface 44a and the second side surface 44d of the window member 44. Accordingly, it is possible to further widen the scannable range by the optical scanning device 1.

In the cross-section illustrated in FIG. 1, the fillet 65 is separated from the first line L1. Accordingly, it is possible to further widen the scannable range by the optical scanning device 1.

The thickness T44 of the window member 44 is thinner than the thickness T51 of the first wall portion 51. Accordingly, the effect of refraction at the window member 44 on optical scanning can be reduced. That is, although it is considered to separate the first corner portion 61 from the first wall portion 51 by thickening the window member 44 in order to separate the first wall portion 51 from the first line L1, there is concern that high-precision optical scanning cannot be realized since the refraction amount at the window member 44 increases when the window member 44 is formed to be thick. In contrast, in the mirror unit 100, since the window member 44 is formed to be thin, the refraction amount at the window member 44 can be reduced and hence high-precision optical scanning can be realized. Particularly, in the mirror unit 100, it is extremely important to reduce the influence of refraction at the window member 44. This is because the incident angle of the light to the window member 44 increases depending on the angle of the mirror surface 7a and the refraction angle of the light emitted from the window member 44 increases in the configuration in which light is scanned by swinging the movable portion 10 provided with the mirror surface 7a as in the mirror unit 100. Further, it is because the incident angle of the light to the window member 44 further increases in the configuration in which the window member 44 is inclined as in the mirror unit 100.

The first side surface 44c of the window member 44 is inclined with respect to the first wall portion 51 in the X-axis direction so as to face the location side of the second wall portion 52 (move closer to the second wall portion 52) as it goes away from the first wall portion 51 when viewed from the Y-axis direction. Accordingly, the first corner portion 61 at the side of the first wall portion 51 can be brought closer to the mirror surface 7a in the X-axis direction. As a result, it is easy to separate the first line L1 from the first wall portion 51 which is apt to interrupt light when the movable portion 10 is swung around the second axis X2.

The present disclosure is not limited the above-described embodiment. For example, the materials and shapes of the components are not limited to the materials and shapes described above and various materials and shapes can be adopted. The thickness T51 of the first wall portion 51 may be different from the thickness T52 of the second wall portion 52. In the optical scanning device 1 of the embodiment, the movable portion 10 is driven by an electromagnetic force, but the movable portion 10 may be driven by an electrostatic force or a piezoelectric element. The frame member 43 may be disposed on the support portion 2 so as to surround the mirror surface 7a when viewed from the Z-axis direction.

The window member 44 may be provided with a notch. For example, the notch may be formed in the outer surface 44a and extend along the edge portion of the outer surface 44a. The notch may have, for example, a rectangular cross-section. In this case, in the cross-section of FIG. 1, the window member 44 may have a first corner portion formed at the side of the first wall portion 51 by the outer surface 44a and the inner surface of the notch, a second corner portion formed at the side of the second wall portion 52 by the outer surface 44a and the inner surface of the notch, a third corner portion formed by the inner surface of the notch and the first side surface 44c, and a fourth corner portion formed by the inner surface of the notch and the second side surface 44d. In this case, in the cross-section of FIG. 1, the first wall portion 51 may be separated from the line passing through the first end P1 at the side of the first wall portion 51 in the mirror surface 7a and the first corner portion. Accordingly, similarly to the above-described embodiment, it is possible to prevent the light reflected from the mirror surface 7a from being interrupted by the first wall portion 51 higher than the second wall portion 52. In the cross-section of FIG. 1, the second wall portion 52 may be separated from the line passing through the second end P2 at the side of the second wall portion 52 in the mirror surface 7a and the second corner portion. Accordingly, similarly to the above-described embodiment, it is possible to further widen the scannable range by the optical scanning device 1. In the cross-section of FIG. 1, the first wall portion 51 may be separated or may not be separated from the line passing through the first end P1 and the third corner portion. In the cross-section of FIG. 1, the second wall portion 52 may be separated or may not be separated from the line passing through the second end P2 and the fourth corner portion. The outer surface 44a of the window member 44 means a surface located on the outermost side with respect to the optical scanning device 1 and does not include the inner surface of the notch.

What is claimed is:

1. A mirror unit comprising:
an optical scanning device including a movable portion swingable around a predetermined axis and a mirror surface provided on the movable portion;
a frame member disposed so as to surround the mirror surface when viewed from a first direction;
a window member disposed on the frame member so as to cover an opening of the frame member; and
a base including a surface on which the optical scanning device is disposed,
wherein the frame member includes a first wall portion and a second wall portion which face each other in a second direction perpendicular to the first direction,
wherein a height of the first wall portion from the surface of the base is higher than a height of the second wall portion from the surface of the base,
wherein the window member is disposed on a top surface of the first wall portion and a top surface of the second wall portion and is inclined with respect to an overlapping region in the surface of the base, wherein the overlapping region overlaps with the optical scanning device when viewed from the first direction, and
wherein in a cross-section passing through the mirror surface and parallel to both the first direction and the second direction, at least one of a thickness of the first wall portion and a thickness of the second wall portion in the second direction is greater than a thickness of the base at the overlapping region in the first direction.

2. The mirror unit according to claim 1, wherein the window member is formed in a plate shape.

3. The mirror unit according to claim 1, wherein the base is bonded to the frame member by a bonding material.

4. The mirror unit according to claim 1, wherein the base and the frame member are integrally formed so as to configure a single member.

5. The mirror unit according to claim 1, wherein in the cross-section, at least one of the thickness of the first wall portion and the thickness of the second wall portion in the second direction is thicker than a thickness of the window member.

6. The mirror unit according to claim 1, wherein in the cross-section, the thickness of the first wall portion in the second direction is greater than a distance between the optical scanning device and the first wall portion in the second direction.

7. The mirror unit according to claim 1, wherein the optical scanning device further includes a support portion,
wherein the movable portion including:
a first movable portion;
a second movable portion that surrounds the first movable portion with a gap and is surrounded by the support portion with a gap when viewed from the first direction;
a pair of first connection portions connecting the first movable portion to the second movable portion so that the first movable portion is swingable around a first axis; and
a pair of second connection portions connecting the second movable portion to the support portion so that the second movable portion is swingable around a second axis perpendicular to the first axis, and
wherein the optical scanning device is disposed so that the first axis is parallel to the second direction and the second axis is parallel to a third direction perpendicular to both the first direction and the second direction.

8. The mirror unit according to claim 1,
wherein the optical scanning device further includes a support portion,
wherein the movable portion including:
a first movable portion;
a second movable portion that surrounds the first movable portion with a gap and is surrounded by the support portion with a gap when viewed from the first direction;
a pair of first connection portions connecting the first movable portion to the second movable portion so that the first movable portion is swingable around a first axis; and
a pair of second connection portions connecting the second movable portion to the support portion so that the second movable portion is swingable around a second axis perpendicular to the first axis, and
wherein the first movable portion includes a first portion on which the mirror surface is formed, a second portion surrounding the first portion with a gap, and a connection portion connecting the first portion to the second portion.

9. The mirror unit according to claim 7,
wherein a length of the second movable portion in the second direction is longer than a length of the second movable portion in the third direction when viewed from the first direction.

10. The mirror unit according to claim 1,
wherein in the cross-section, at least one of the thickness of the first wall portion and the thickness of the second wall portion in the second direction is greater than a thickness of the base at a contacting region in the surface of the base in the first direction, wherein the optical scanning device is in contact with the contacting region.

11. The mirror unit according to claim 1,
wherein in the cross-section, at least one of the thickness of the first wall portion and the thickness of the second wall portion in the second direction is greater than a minimum thickness of the base at the overlapping region in the first direction.

12. The mirror unit according to claim 1,
wherein in the cross-section, at least one of the thickness of the first wall portion and the thickness of the second wall portion in the second direction is greater than a maximum thickness of the base at the overlapping region in the first direction.

13. The mirror unit according to claim 1,
wherein a depression is provided at a region in the surface of the base, wherein the region faces the movable portion of the optical scanning device in the first direction.

14. The mirror unit according to claim 1,
wherein the optical scanning device further includes a support portion which supports the movable portion, and
wherein the support portion is fixed to the surface of the base.

* * * * *